United States Patent
Lindel et al.

(10) Patent No.: US 11,958,367 B2
(45) Date of Patent: Apr. 16, 2024

(54) DC CHARGING STATION WITH SELECTIVELY UNLOCKABLE AC CHARGING CAPABILITIES

(71) Applicant: Dr. Ing. h.c. F. Porsche Aktiengesellschaft, Stuttgart (DE)

(72) Inventors: Lukas Lindel, Kornwestheim (DE); Mark Köhler, Großbottwar (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 295 days.

(21) Appl. No.: 17/480,247

(22) Filed: Sep. 21, 2021

(65) Prior Publication Data
US 2022/0097539 A1  Mar. 31, 2022

(30) Foreign Application Priority Data
Sep. 29, 2020  (DE) ............ 10 2020 125 339.7

(51) Int. Cl.
*B60L 53/10* (2019.01)
*B60L 53/14* (2019.01)
(Continued)

(52) U.S. Cl.
CPC ............. *B60L 53/11* (2019.02); *B60L 53/14* (2019.02); *B60L 53/16* (2019.02); *B60L 53/18* (2019.02);
(Continued)

(58) Field of Classification Search
CPC .......... B60L 53/11; B60L 53/14; B60L 53/16; B60L 53/18; B60L 53/31; B60L 53/68;
(Continued)

(56) References Cited

U.S. PATENT DOCUMENTS 9,511,676 B2 * 12/2016 Loftus ................ B60L 53/16
2009/0296442 A1 * 12/2009 Chang ................ H02J 7/342
320/105

(Continued)

FOREIGN PATENT DOCUMENTS

| CN | 208602341 | 3/2019 |
|---|---|---|
| DE | 202010014316 U1 | 1/2012 |

(Continued)

OTHER PUBLICATIONS

UK Search Report dated Jan. 13, 2022.

(Continued)

*Primary Examiner* — Richard Isla
*Assistant Examiner* — Manuel Hernandez
(74) *Attorney, Agent, or Firm* — Gerald E. Hespos; Michael J Porco

(57) ABSTRACT

A charging station (10) is provided for electrical DC charging of an electric vehicle with a charging power of at least 150 kW. The charging station (10) has a charging cable (11) with a charging plug (12), via which an electric vehicle to be charged is able to be coupled to the charging station (10) for the purpose of electrical DC charging. A charging interface (13) for electrical AC charging is integrated into the charging station (10). An electric vehicle to be charged can be coupled to the charging interface via a charging cable of the electric vehicle to be charged.

12 Claims, 1 Drawing Sheet

(51) Int. Cl.
  *B60L 53/16* (2019.01)
  *B60L 53/18* (2019.01)
  *B60L 53/31* (2019.01)
  *B60L 53/68* (2019.01)
  *H01R 13/52* (2006.01)
  *H02J 7/00* (2006.01)
  *H02J 7/02* (2016.01)

(52) U.S. Cl.
  CPC ............... *B60L 53/31* (2019.02); *B60L 53/68* (2019.02); *H01R 13/5213* (2013.01); *H02J 7/0013* (2013.01); *H02J 7/0045* (2013.01); *H02J 7/02* (2013.01); *H01R 2201/26* (2013.01)

(58) Field of Classification Search
  CPC ............ H01R 13/5213; H01R 2201/26; H02J 7/0013; H02J 7/0045; H02J 7/02
  USPC ........................................................ 320/109
  See application file for complete search history.

(56) References Cited

U.S. PATENT DOCUMENTS

| | | | | |
|---|---|---|---|---|
| 2010/0013433 | A1* | 1/2010 | Baxter | .................. G07F 15/003 |
| | | | | 320/109 |
| 2011/0055037 | A1 | 3/2011 | Hayashigawa et al. | |
| 2012/0112697 | A1 | 5/2012 | Heuer et al. | |
| 2013/0015951 | A1 | 1/2013 | Kuramochi et al. | |
| 2013/0181674 | A1 | 7/2013 | Tremblay et al. | |
| 2019/0047426 | A1 | 2/2019 | Effenberger et al. | |
| 2019/0135116 | A1 | 5/2019 | Narla | |
| 2020/0070672 | A1* | 3/2020 | Vahedi | .................. H02M 7/219 |
| 2022/0185132 | A1* | 6/2022 | Næsje | ...................... B60L 53/31 |

FOREIGN PATENT DOCUMENTS

| | | | | |
|---|---|---|---|---|
| DE | 20 2010 014 316 | | 3/2012 | |
| DE | 202010014316 U1 | * | 3/2012 | .......... B60L 11/1816 |
| DE | 102021006076 A1 | * | 2/2022 | |
| EP | 3 656 603 | | 5/2020 | |
| EP | 3656603 | | 5/2020 | |
| JP | 2010028913 | | 1/2010 | |
| JP | 2016144385 | | 8/2016 | |
| WO | WO-2011108925 A2 | * | 9/2011 | .............. B60L 1/003 |

OTHER PUBLICATIONS

Combined Search and Examination Report dated Jan. 14, 2022.
Atess Power Technology Co, Dec. 22, 2020, DC/AC Combo Charging Station, Atess Power, [online], Available from: https://web.archive.org/web/20201222144317/https:/www.atesspower.com/Product/EV/DCAS/43.html [Oct. 1, 2022].

* cited by examiner

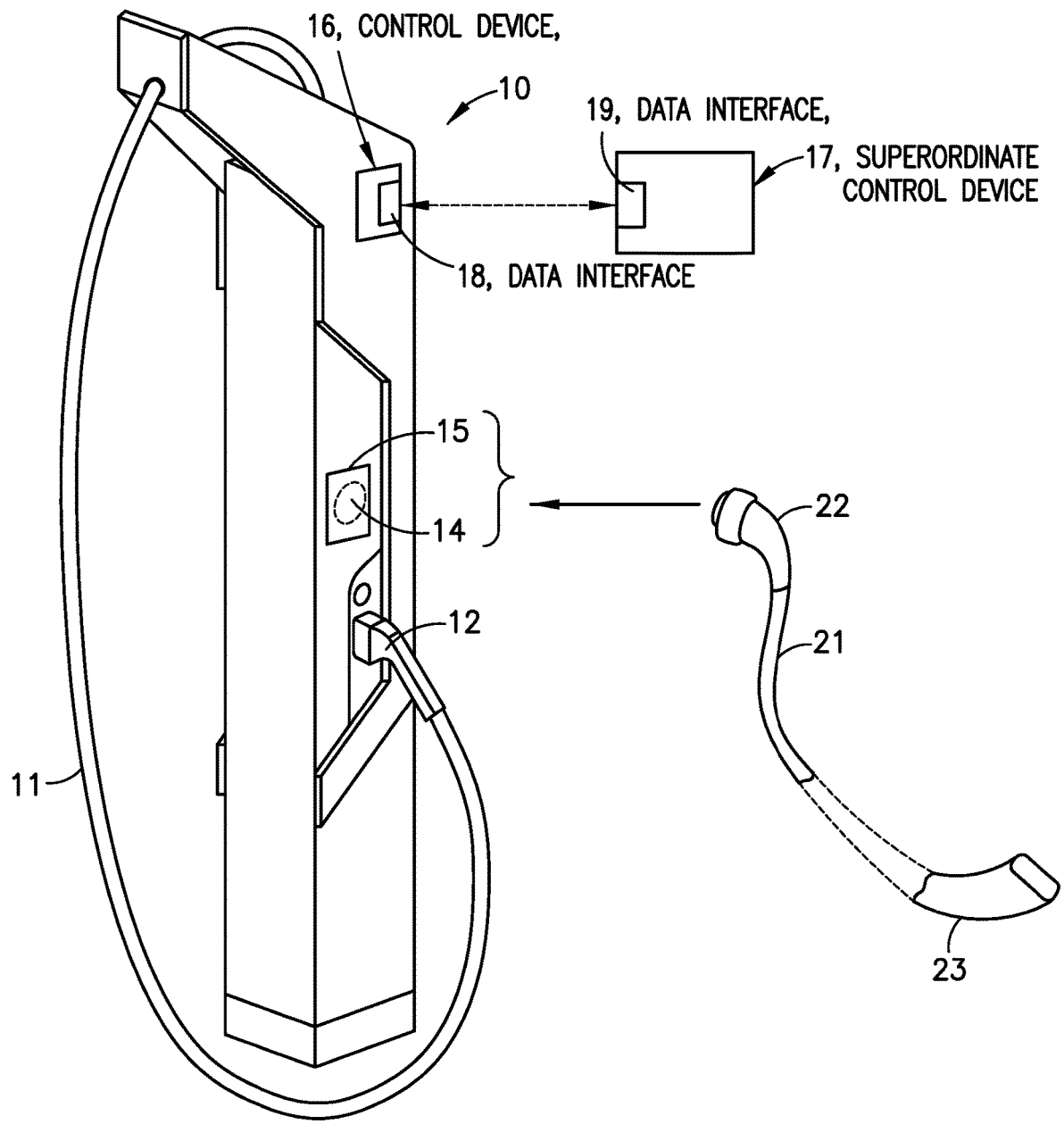

DC CHARGING STATION WITH SELECTIVELY UNLOCKABLE AC CHARGING CAPABILITIES

CROSS REFERENCE TO RELATED APPLICATION

This application claims priority under 35 USC 119 to German Patent Appl. No. 10 2020 125 339.7 filed on Sep. 29, 2020, the entire disclosure of which is incorporated herein by reference.

BACKGROUND

Field of the Invention

The invention relates to a charging station for electrical DC charging of an electric vehicle.

Related Art

An electrical traction battery of an electric vehicle is charged by coupling the electric vehicle to a charging station. However, a distinction is made between electrical DC charging and electrical AC charging. Electrical DC charging can be effected with significantly higher charging powers, and accordingly electrical DC charging can be completed significantly faster than electrical AC charging.

EP 3 656 603 A1, US 2012/0112697 A1, US 2013/0015951 A1 and US 2013/0181674 A1 each disclose charging stations for the electrical charging of an electric vehicle. The charging station known from US 2013/0181674 A1 has a charging cable with a charging plug, and the electric vehicle to be charged can be coupled to the charging station via the charging cable of the charging station. For this purpose, the charging plug of the charging cable is able to be coupled to a charging socket of the vehicle. The charging station known from EP 3 656 603 A1 can be unlocked and locked in a remote-controlled manner by a computer.

As noted above, charging stations are embodied either for electrical DC charging or for electrical AC charging. The available space offered at charging parks or filling stations is limited. Therefore, providing charging stations for electrical DC charging and also providing charging stations for electrical AC charging poses difficulties. An existing charging station that is designed for electrical DC charging may not be available for DC charging due to technical problems. In this situation, the vehicle that is to be charged cannot alternatively be subjected to electrical AC charging in an emergency charging process to provide at least enough range for the vehicle to reach the nearest functioning DC charging station. In the extreme case, an electric vehicle to be charged is left stranded.

There is a need to increase the availability of a charging station for a charging process of an electric vehicle.

It is an object of the invention to provide a novel charging station.

SUMMARY

According to the invention, a charging interface for electrical AC charging is integrated into a charging station for electrical DC charging of an electric vehicle with a charging power of at least 150 kW. An electric vehicle to be charged can be coupled to the charging interface via a charging cable of the electric vehicle to be charged. Thus, the invention integrates a charging interface for electrical AC charging into a charging station for electrical DC charging having a charging power of at least 150 kW. If the charging station for electrical DC charging is not available for DC charging due to technical problems or if the charging infrastructure of the electric vehicle to be charged is not compatible with the charging station for electrical DC charging, at least an emergency charging process by way of the electrical AC charging can be ensured to prevent an electric vehicle that is to be charged from being stranded.

The charging interface for electrical AC charging has a charging socket and may have a cover for the charging socket. If the charging interface has both the cover and the charging socket, the charging socket of the charging interface is accessible for AC charging only if the cover has been unlocked and thus releases or exposes the charging socket. This is advantageous to protect the charging socket for AC charging against weather influences and to prevent the charging socket for electrical AC charging from being contacted when the charging interface for AC charging is locked.

The charging interface for electrical AC charging of some embodiments is unlockable and lockable in a remote-controlled manner. Unlocking the charging interface for electrical AC charging enables the charging socket thereof to be coupled to an electrical AC grid. Alternatively or additionally, when unlocking the charging station, the cover of the charging interface is unlockable for the purpose of releasing the charging socket. For the purpose of locking the charging interface for electrical AC charging, the charging socket thereof is disconnectable from the electrical AC grid. Alternatively or additionally, when locking the charging station, the cover of the charging interface is lockable for purposes of blocking the charging socket.

The remote-controlled unlocking and remote-controlled locking of the charging interface for electrical AC charging, initiated by an operator of the charging station, is particularly preferred. In this regard, as necessary, the charging station actually designed for electrical DC charging can, as an exception, be released for electrical AC charging. This can be effected for a limited time duration to enable an emergency charging process by way of AC charging, particularly if an electric vehicle to be charged is not compatible with the charging station for DC charging.

The charging station may have a control device that communicates with a superordinate control device of a charging station operator via a data interface in order to unlock the charging interface for electrical AC charging in a remote-controlled manner and to lock it in a remote-controlled manner. This embodiment is preferred for the remote-controlled locking and remote-controlled unlocking of the charging interface for electrical AC charging. The charging station operator can thus adapt the availability of the charging station for AC charging individually and as necessary.

Preferred developments of the invention are evident from the following description. Exemplary embodiments of the invention are explained in greater detail, without being restricted thereto, with reference to the drawing.

BRIEF DESCRIPTION OF THE DRAWINGS

FIG. 1 is a perspective view of a charging station for electrical DC charging of an electric vehicle together with a superordinate control device of a charging station operator.

DETAILED DESCRIPTION

FIG. 1 is a perspective view of a charging station 10 for electrical DC charging of a traction battery of an electric vehicle. The charging station 10 designed for electrical DC charging in this case has a charging power during electrical DC charging of at least 150 kW.

The charging station may enable so-called high-power fast charging of a discharged traction battery to be effected in a time of an order of magnitude of approximately one half an hour.

The charging station 10 for electrical DC charging has a charging cable 11 with a charging plug 12. An electric vehicle to be charged can be coupled to the charging station 10 via the charging plug 12 of the charging cable 11 of the charging station 10, specifically for electrical DC charging.

A charging interface 13 for electrical AC charging is integrated into the charging station 10 for electrical DC charging. An electric vehicle to be charged is able to be coupled to the charging interface 13 for AC charging via a second charging cable 21 that is the property of the operator the electric vehicle to be charged in an emergency charging process or that is the property of the operator of the charging park or the filling station. The second charging cable 21 has a plug 22 that is selectively connectable to the charging interface 13 of the charging station 10 and a second plug 23 that is connected to or connectable to the vehicle. Such an emergency charging process enables a traction battery of an electric vehicle to be charged to a certain extent to make a reserve range available.

The charging interface 13 for electrical AC charging has at least one charging socket 14 and, in the illustrated embodiment, also has a cover 15 for the charging socket 14.

The charging socket 14 is preferably a type 2 charging socket of the IEC 62196 standard.

If the charging station 10 is not available for electrical DC charging due to technical problems, for example, or if an electric vehicle to be charged cannot be subjected to electrical DC charging on account of compatibility problems at the charging station 10, the charging interface 13 can be utilized for electrical AC charging to subject the electric vehicle to an emergency charging process.

The charging interface 13 for electrical AC charging of some embodiments is unlockable and lockable in a remote-controlled manner.

The charging station 10 of some embodiments has a control device 16 that communicates with a superordinate control device 17 of a charging station operator. In this regard, both the control device 16 of the charging station 10 and the superordinate control device 17 of the charging station operator have a data interface 18 and 19, respectively, to enable data exchange or communication between the control devices 16, 17. The data interfaces 18, 19 can be designed for wireless data exchange via a telephone network, such as an LTE network.

The charging interface 13 for electrical AC charging can be unlocked and locked automatically by the control device 16, specifically depending on a technical availability of the electrical DC charging.

If the control device 16 of the charging station 10 ascertains that electrical DC charging is temporarily not possible due to a current supply problem or voltage supply problem, then the control device 16 can automatically unlock the charging interface 13 for electrical AC charging to make the charging station 10 usable at least for electrical AC charging. If the voltage supply or current supply is subsequently available again for electrical DC charging with a charging power of at least 150 kW, then the control device 16 can automatically lock the charging interface 13 for electrical AC charging again to reserve the charging station 10 for electrical DC charging.

It is likewise possible that if the charging electronics of an electric vehicle are not compatible with the charging station 10 with regard to the electrical DC charging, in a remote-controlled manner via the superordinate control device 17 of a charging station operator the charging interface 13 is temporarily unlocked and thus released for electrical AC charging to enable an emergency charging process for the electric vehicle. This can be limited to a defined period of time in order not to block the charging station 10 for an excessively long time for a charging process by way of electrical AC charging and thus to increase the availability of the charging station for electrical DC charging with high charging power. This remote-controlled unlocking of the charging interface 13 for electrical AC charging can be requested and initiated by the driver of an electric vehicle at the charging station 10 via a corresponding interface.

In the illustrated embodiment, in which the charging interface 13 for electrical AC charging has the charging socket 14 and the cover 15, it is provided that for the purpose of unlocking the charging interface 13 for electrical AC charging, the cover 15 is unlockable to release the charging socket 14. In the course of subsequently locking the charging interface 13 for AC charging, the cover 15 is lockable to block the charging socket 14.

Additionally or alternatively, provision can be made for coupling the charging socket 14 to an electrical AC grid for the purpose of unlocking the charging interface 13 for electrical AC charging, and for disconnecting the charging socket 14 from the electrical AC grid when locking the charging interface 13. This can be effected via a controllable switch.

If the charging interface 13 for electrical AC charging has only the power socket 14, but no cover 15, then the unlocking and locking of the charging interface 13 is limited to the coupling and disconnection of the charging socket 14 to and respectively from the electrical AC grid.

The invention proposes a charging station 10 designed for electrical DC charging with a charging power of at least 150 kW. The invention thus proposes integrating a charging interface 13 for electrical AC charging into such a charging station 10. The charging interface preferably is available only if necessary, specifically in particular by means of remote-controlled activation or unlocking thereof. The charging interface 13 for electrical AC charging preferably has a type 2 charging socket 14 of the IEC 62196 standard.

The invention enables the availability of an electric vehicle to be increased by virtue of the fact that an emergency charging process by way of electrical AC charging is made possible even at a charging station 10 designed for electrical DC charging at high charging power.

This can be effected either if DC charging is temporarily not possible at the charging station 10 on account of technical problems, and/or if there are interoperability problems or compatibility problems between the charging station 10 in regard to DC voltage charging and the charging electronics of the electric vehicle for DC voltage charging.

Even under confined space conditions at charging parks or filling stations, an electric vehicle can thus be charged flexibly. The availability of the charging station 10 for electrical AC charging can be adapted as necessary in order to ensure a sufficient availability of the charging station 10 for electrical DC charging at high charging power.

AC charging is effected in particular with a charging power of a maximum of 15 kW. Accordingly, at the charging point 10 the charging power of DC charging is greater or higher than the charging power of AC charging by at least a factor of 10.

What is claimed is:

1. A charging station for electrical DC charging of an electric vehicle with a charging power of at least 150 kW, the charging station comprising: a charging cable with a charging plug configured to couple an electric vehicle to be charged to the charging station for purposes of electrical DC charging; and a charging interface having a charging socket for electrical AC charging integrated into the charging station, the charging interface having a cover configured for selectively covering the charging socket, and the charging interface being configured to be coupled to an electric vehicle to be charged via a charging cable of the electric vehicle to be charged, wherein the charging interface for electrical AC charging is unlockable and lockable automatically by a control device of the charging station depending on an availability of the electrical DC charging.

2. The charging station of claim 1, wherein the charging station further has a control device that communicates with a superordinate control device of a charging station operator via a data interface in order to selectively unlock the charging interface for electrical AC charging in a remote-controlled manner and for a limited time duration and subsequently to lock the charging interface from further electrical AC charging, thereby freeing up the charging station for the electrical DC charging.

3. The charging station of claim 1, wherein
for the purpose of unlocking the charging interface for electrical AC charging, the charging socket thereof is able to be coupled to an electrical AC grid,
for the purpose of locking the charging interface for electrical AC charging, the charging socket thereof is disconnectable from the electrical AC grid.

4. The charging station of claim 1, wherein
for the purpose of unlocking the charging interface for electrical AC charging, the cover thereof is unlockable for the purpose of releasing the charging socket,
for the purpose of locking the charging interface for electrical AC charging, the cover thereof is lockable for the purpose of blocking the charging socket.

5. A charging station for electrical DC charging of an electric vehicle with a charging power of at least 150 kW, wherein the charging station comprises: a charging cable with a charging plug configured to couple an electric vehicle to be charged to the charging station for purposes of electrical DC charging; and a charging interface having a charging socket for electrical AC charging integrated into the charging station and configured to be coupled to an electric vehicle to be charged via a charging cable of the electric vehicle to be charged, the charging interface having a cover for the charging socket, the charging station having a control device that communicates in a remote controlled manner with a superordinate control device of a charging station operator via a data interface to selectively unlock the charging interface for electrical AC charging for a limited time duration and subsequently to lock the charging interface for further electrical AC charging, thereby freeing up the charging station for the electrical DC charging.

6. The charging station of claim 5, wherein the charging socket is a type 2 charging socket of the IEC 62196 standard.

7. A charging system, comprising: a charging station for electrical DC charging of a first electric vehicle with a charging power of at least 150 kW; a first charging cable with a first end integrated into the charging station and a second end having a charging plug configured to couple the first electric vehicle to be charged to the charging station for purposes of electrical DC charging; a charging interface for electrical AC charging integrated into the charging station and having a charging socket; and a second charging cable with a first end releasably connectable to the charging interface and a second end configured to be coupled to a second electric vehicle to be charged via the second charging cable, the charging interface for electrical AC charging having a cover for the charging socket that is unlockable and lockable in a remote-controlled manner by a control device of the charging station depending on an availability of the electrical DC charging.

8. The charging system of claim 7, wherein the charging socket is a type 2 charging socket of the IEC 62196 standard.

9. The charging system of claim 7, wherein the charging interface for electrical AC charging has a cover for the charging socket.

10. The charging system of claim 7, wherein the charging station further has a control device that communicates with a superordinate control device of a charging station operator via a data interface in order to selectively unlock and lock the charging interface for electrical AC charging in a remote-controlled manner.

11. The charging system of claim 7, wherein
for the purpose of unlocking the charging interface for electrical AC charging, the charging socket thereof is able to be coupled to an electrical AC grid,
for the purpose of locking the charging interface for electrical AC charging, the charging socket thereof is disconnectable from the electrical AC grid.

12. The charging system of claim 7, wherein
for the purpose of unlocking the charging interface for electrical AC charging, the cover thereof is unlockable for the purpose of releasing the charging socket,
for the purpose of locking the charging interface for electrical AC charging, the cover thereof is lockable for the purpose of blocking the charging socket.

* * * * *